United States Patent [19]

Sumiyoshi et al.

[11] Patent Number: 5,602,578
[45] Date of Patent: Feb. 11, 1997

[54] COLOR PRINTER WITH TRANSFER AND SUPERPOSITION OF DIFFERENT COLOR TONER IMAGES ONTO INTERMEDIATE TRANSCRIPTION MEMBER

[75] Inventors: Michio Sumiyoshi; Akira Sasaki; Hiroyuki Tadokoro; Takeshi Kato; Isamu Terashima, all of Hitachi; Junichi Matsuno, Tsuchiura; Masaru Nakano, Tsukuba, all of Japan

[73] Assignee: Hitachi, Ltd., Tokyo, Japan

[21] Appl. No.: 205,153

[22] Filed: Mar. 3, 1994

[30] Foreign Application Priority Data

Mar. 5, 1993 [JP] Japan .................................. 5-044848

[51] Int. Cl.⁶ .................. B41J 2/47; B41J 2/435; G03G 21/00; H04N 1/46
[52] U.S. Cl. ............... 347/232; 358/300; 358/501; 399/4; 399/167
[58] Field of Search .................... 355/271, 274, 355/275, 326 R, 327, 208, 212, 207; 347/232, 119, 115; 358/300, 412, 481, 409, 501

[56] References Cited

U.S. PATENT DOCUMENTS

| | | | |
|---|---|---|---|
| 4,752,804 | 6/1988 | Ohno | 355/327 |
| 5,227,850 | 7/1993 | Sato et al. | 355/271 |
| 5,285,221 | 2/1994 | Sumiyoshi et al. | 347/119 |
| 5,313,252 | 5/1994 | Castelli et al | 355/275 X |
| 5,319,423 | 6/1994 | Takeda et al. | 355/271 |
| 5,390,010 | 2/1995 | Yamahata et al. | 355/271 |
| 5,424,763 | 6/1995 | Komiya et al. | 347/232 X |

FOREIGN PATENT DOCUMENTS

| | | |
|---|---|---|
| 62-195687 | 8/1987 | Japan . |
| 63-81370 | 4/1988 | Japan . |

*Primary Examiner*—Shuk Yin Lee
*Attorney, Agent, or Firm*—Antonelli, Terry, Stout & Kraus, LLP

[57] ABSTRACT

An intermediate transcription drum is supported so as to be driven in contacting relationship with a photosensitive belt. The rotating speed of the photosensitive belt driving motor is controlled by a control unit such that one rotation cycle of the intermediate transcription drum becomes a given cycle. An adjustment of the speed control data for the photosensitive belt driving motor is performed in the interval between electrostatic latent image forming. Thereby, a speed difference between the photosensitive belt and the intermediate transcription drum does not occur, and a plurality of the toner images can be transferred and accurately superposed onto the outer surface of the intermediate transcription drum.

3 Claims, 12 Drawing Sheets

5,602,578

COLOR PRINTER WITH TRANSFER AND SUPERPOSITION OF DIFFERENT COLOR TONER IMAGES ONTO INTERMEDIATE TRANSCRIPTION MEMBER

BACKGROUND OF THE INVENTION

The present invention relates to a laser printer, and more particularly to a color printer which obtains a color image by transferring and superposing different color toner images onto an intermediate transcription member.

A color laser printer forms a color picture by transferring and superposing a plurality of toner images having different colors, which have been formed on a photosensitive member utilizing electro-photographic technology, onto an intermediate transcription member, so as to carry out color picture printing. To accomplish this, a photosensitive member, such as a photosensitive drum or photosensitive belt having photo-conductivity, is rotated with a given speed; the outer surface of the photosensitive member is charged uniformly; a laser beam scanning in a direction perpendicular to the rotating direction of the photosensitive member is intermittently controlled according to video data corresponding to a picture to be printed in order to form an electrostatic latent image on the outer surface of the photosensitive member with exposure control; and a toner image is formed by developing the electrostatic latent image formed on the outer surface of the photosensitive member by said exposure. The printer is constructed so as to repeat the process a number of times wherein the toner image is transcribed and transferred onto an intermediate transcription member rotating in contact with the photosensitive member. Electrostatic latent images for different color toner images are repeatedly formed onto the photosensitive member according to video data received from an image data generator different color images are formed by developing the electrostatic latent images; a color toner image is formed on the intermediate transcription member in such a way that the toner images are repeatedly transcribed and transferred onto the intermediate transcription member; and then, the color toner image is transferred onto paper where the toner is fixed.

In such a laser printer, having a photosensitive member and an intermediate transcription member, the accuracy in positioning each of the different color toner images on the intermediate transcription member is important to obtaining a high definition color image. For this purpose, a printer has been proposed including control means which controls both the driving means for the photosensitive member and for an intermediate transcription member in synchronism with a common basic clock signal and which controls the exposure and transcription timings for each of the colors using the basic clock signal, as described in Japanese Patent Application Laid-Open No. 62-195687 (1987). Further, a color printer is proposed in Japanese Patent Application Laid-Open No. 63-81370 (1988) in which a transcribed paper transmitting belt is rotated by being driven with a plurality of photosensitive drums in contact with the photosensitive drums and the speed of each photosensitive member driving means is controlled by detecting the speed of the transcribed paper transmitting belt.

In such control means for a conventional color printer, the distortion of the photosensitive member and the intermediate transcription member due to changes in environment, such as temperature, is not taken into consideration. Thus, it is difficult, when such a distortion occurs, for the former control unit to ensure that the photosensitive member and the intermediate transcription member will always be driven with a synchronizing speed, since a relative speed difference between the photosensitive member and the intermediate transcription member appears even though they are driven in synchronism with the basic clock signal due to the distortion.

Since either the photosensitive member or the intermediate transcription member is generally formed in a belt-shape, and in most cases the driving means is constructed so as to frictionally transmit the driving force, a relative speed difference is also induced by slip caused in the transmitting portion or by change in the slip with age. In addition to this, in color image printing by superposing a plurality of different color toner images, the apparent outer diameter of the intermediate transcription member changes with the superposing of the toner images onto the intermediate transcription member so as to cause a speed difference as well.

With regard to speed control for the driving means, the timing of the control is not taken into consideration. When a control target value, for example, is changed during the forming of an electrostatic latent image onto the photosensitive member, a disorder appears in the middle of the image being formed so as to cause a positional slip between the image and the electrostatic latent images for the preceding colors.

Furthermore, in the latter construction, where the transcribed paper transmitting belt is driven in contact with a plurality of the photosensitive drums, there has been a problem resulting from inability to obtain a high definition color image caused by shear in the top front positions for each of the color images due to a disorder in synchronization which induces a change in the pitch between rasters when a difference in slip conditions occurs in each of the contact portions.

SUMMARY OF THE INVENTION

An object of the present invention is to provide a high definition color image by accurately superposing each of a plurality of toner images having different colors, which are transferred with a superposing relationship onto an intermediate transcription member, in order to obtain a colored toner image.

The object of the present invention can be attained by providing a color printer having a photosensitive member which is rotated by a photosensitive member driving means, means for controlling laser beam flash by modulating a laser beam with video signals, deflecting means for forming an electrostatic latent image on the photosensitive member by exposing the photosensitive member to the laser beam while scanning the laser beam perpendicular to the rotating direction of the photosensitive member using a polygon mirror, beam detecting means for generating a printing synchronization signal by detecting the laser beam passing across a given position on the photosensitive member, video signal generating means for generating the video signal in synchronism with the printing synchronization signal, developing means for forming a toner image by developing the electrostatic latent image formed on the photosensitive member, an intermediate transcription member rotating in contact with and at a synchronizing speed with the photosensitive member to transfer the toner image formed on the photosensitive member to the contact position of the intermediate transcription member, control means for controlling the printing operation so that a color toner image is formed through repeated formation of different color images on the photosensitive member and superposition of the different color images on the intermediate transcription member. The color printer further includes:

an intermediate transcription member supporting means for supporting the intermediate transcription member in such a manner that the intermediate transcription member may be driven by the photosensitive member due to the contact between photosensitive member and contact portion of the intermediate transcription member detecting means for detecting the intermediate transcription member passing across a predetermined position, intermediate transcription member rotating speed measuring means for detecting the rotating speed of the intermediate transcription member and photosensitive member driving speed adjusting means for controlling the photosensitive member driving speed caused by the photosensitive member driving means, such that the rotating speed of the intermediate transcription member is maintained at a given speed using an intermediate transcription member speed signal obtained from the intermediate transcription member rotating speed measuring means.

Since the intermediate transcription member is driven to rotate by the driving force of friction the electrostatic adsorption force between a contact portion of the intermediate transcription member and the photosensitive member, a relative speed difference does not occur due to distortion of the photosensitive member or the intermediate transcription member.

Further, since the rotating frequency and the rotating speed of the intermediate transcription member can be measured based on the signal from the detecting means for detecting the intermediate transcription member passing across a predetermined position and the signal from the intermediate transcription member rotating speed measuring means during rotation of the intermediate transcription member, the occurrence of a speed difference in every rotation between the photosensitive member and the intermediate transcription member can be eliminated by controlling the photosensitive member driving means based on the measured result. And, by performing this control in the initial processing at the time of power switching-on and/or in the interval between formation of printing pages and/or in the interval between each toner image, a disorder in the image during forming of an image or the positional shear between the formed image and the electrostatic latent images for the preceding colors does not occur due to said control.

DETAILED DESCRIPTION OF THE PREFERRED EMBODIMENTS

The present invention will be described in detail, referring to the accompanying drawings.

Figure 1:
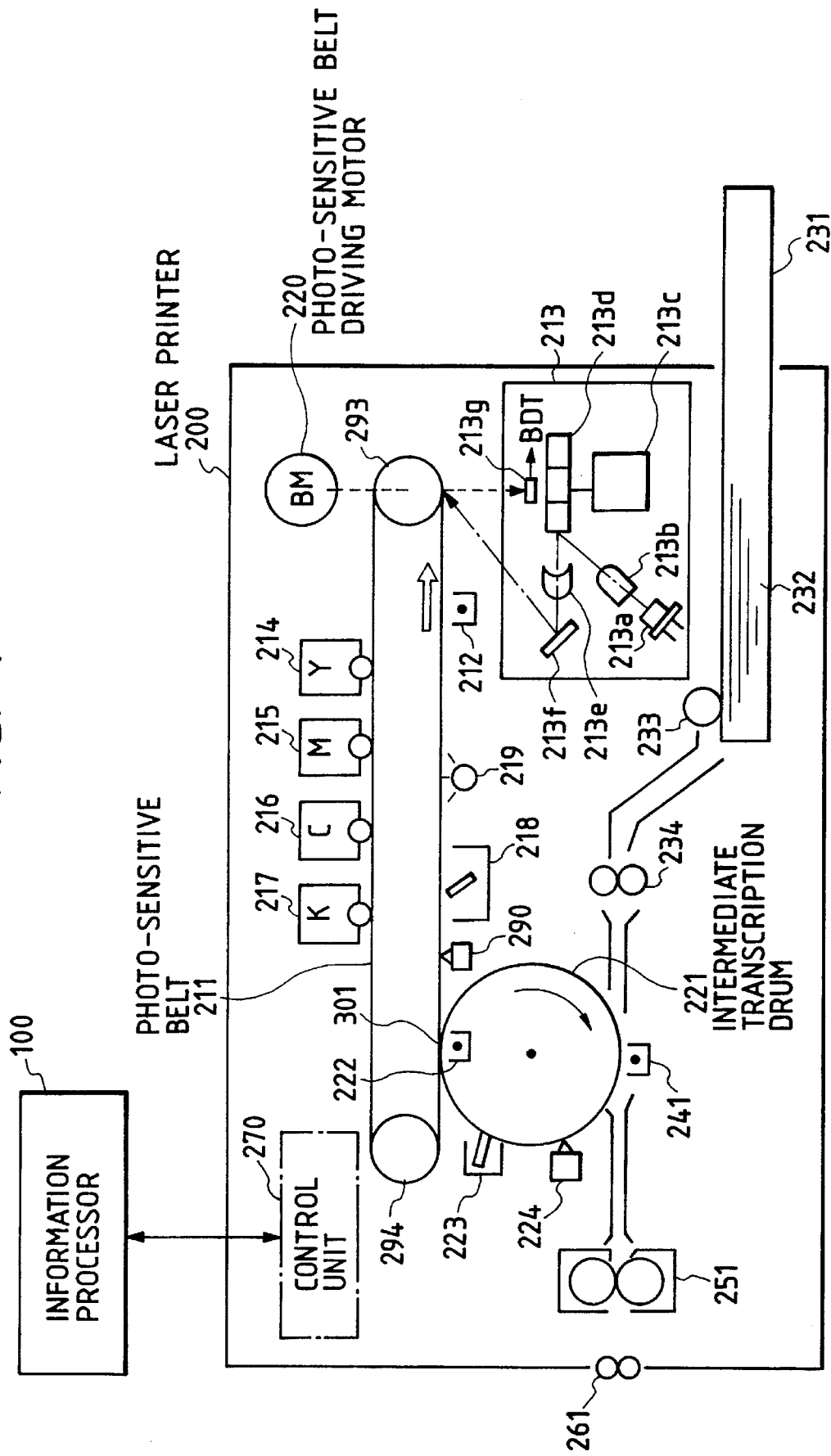
FIG. 1 is a vertical side view schematically showing the main part of a color laser printer according to the present invention.

FIG. 1 is a cross-sectional view showing the main part of a laser printer 200 connected to an information processor 100. The printing part of the laser printer 200 comprises a photosensitive belt 211 carried by rotating drums 293 and 294 so as to rotate in the arrow direction at a constant speed. A photosensitive belt driving motor 220 drives the rotating drum 293 at a constant speed to rotate the photosensitive belt 211. A reflection type photo-sensor 290 is positioned to read a base position mark formed on the outer surface of said photosensitive belt 211 so as to generate a base position signal HPS for a sub-scanning direction of the photosensitive belt 211. An electro static charger 212 uniformly charges the outer surface of said photosensitive belt 211, and a scanning exposing unit 213 forms an electrostatic latent image on the outer surface of the photosensitive belt by exposing the outer surface of the belt, which has been uniformly charged. Four developing units 214, 215, 216 and 217 develop the electrostatic latent images to form toner images, each of the developing units having a sensor to detect whether developer exists which (is not shown in the figure), and a cleaner 218 operates to remove remaining toner on the outer surface of the photosensitive belt after the toner images are transferred. An erasing lamp 219 operates to erase the charge remaining on the outer surface of the photosensitive belt.

Figure 2:
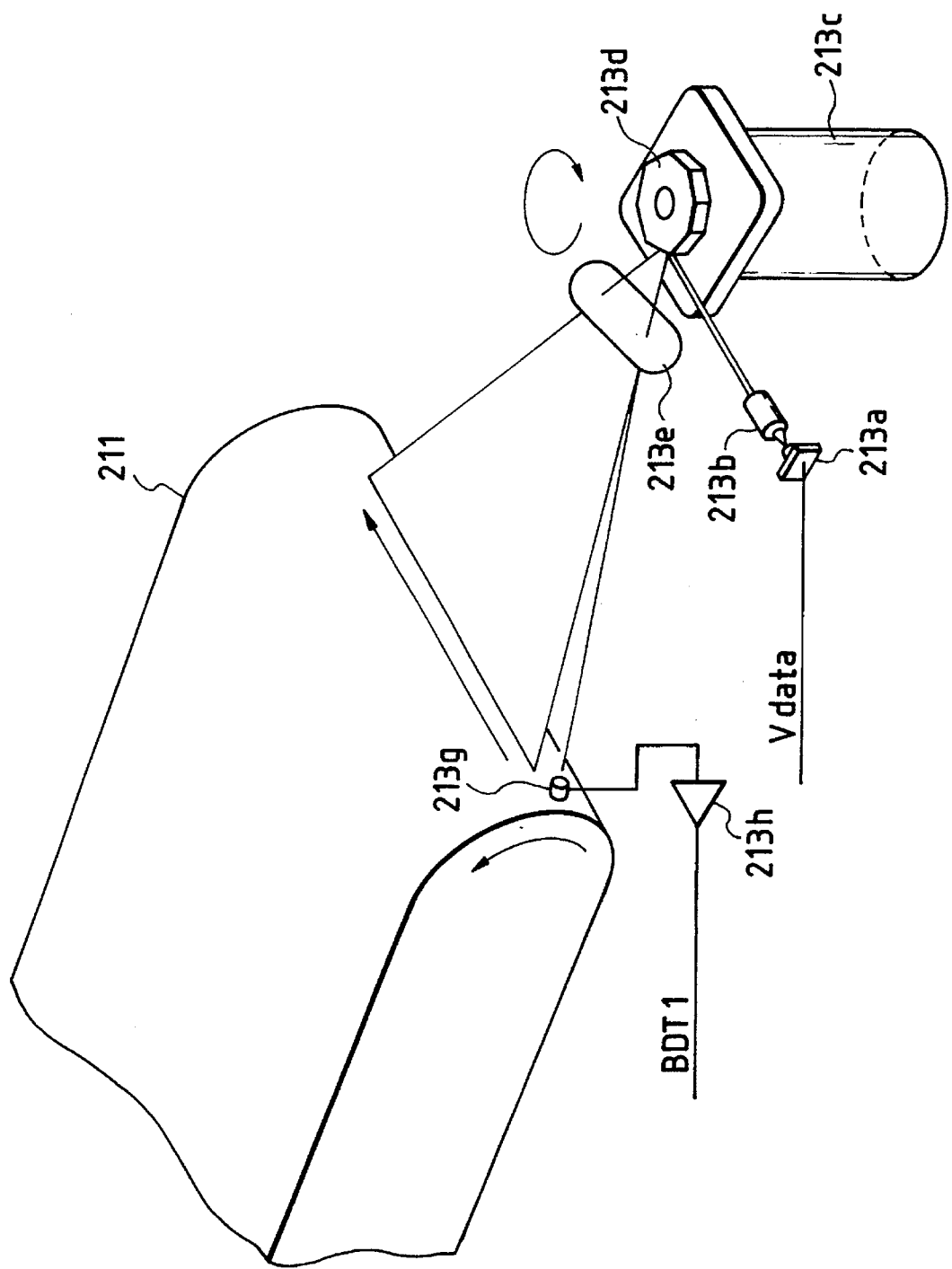
FIG. 2 is a perspective view of the scanning exposing part of a color laser printer according to the present invention.

The scanning exposing unit 213 condenses a laser beam output from a semiconductor laser 213a according to video data using a condenser lens 213b to form a parallel laser beam, said laser beam being reflected using a polygon mirror 213d rotated at a constant speed with a mirror motor 213c to convert it into a repeated deflection beam. The reflection beam being is then radiated onto the outer surface of the photosensitive belt to form a beam spot through a projection lens 213e and a return mirror 213f, and the outer surface of the photosensitive belt is exposed by scanning the beam spot. The scanning exposing unit 213, as shown in FIG. 2, has a beam detector 213g to detect the timing at which the beam spot passes across a reflection scanning start base position in each reflection scanning, and the signal obtained from the beam detector 213g is amplified using an amplifier 213h to output it as a reflection scanning start base detection signal BDT1.

The developing unit 214 uses yellow toner as a developer, the developing unit 215 uses magenta toner as a developer, the developing unit 216 uses cyanine blue toner as a developer, and the developing unit 217 uses black toner as a developer. Each of the developing units is operated to control its developing function by means of a controlling bias voltage. The bias voltage control is performed using a specified signal from the information processor 100 in such a manner that the developing unit corresponding to the color specified by the video data is used to form the electrostatic latent image.

An intermediate transcription drum 221 is used for superposing a plurality of different color images formed on the outer surface of the photosensitive belt to form a colored image and for then transferring the colored image to paper. The intermediate transcription drum 221 is driven to rotate in the arrow direction as seen in the figure at a speed synchronized with the speed of the outer surface of said photosensitive belt and is driven by forces including the friction force and the electrostatic adsorption force between a contact portion 301 and the photosensitive belt 211, which is driven by the photosensitive belt driving motor 220. A transcription unit 222, which operates to transfer a toner image on the outer surface of said photosensitive belt 211 onto the outer surface of the intermediate transcription drum 221, is installed inside said intermediate transcription drum 221 in the region where the outer surface of the intermediate transcription drum is in contact with the outer surface of the photosensitive belt 211.

A cleaner 223, which operates to remove any remaining toner on the outer surface of the intermediate transcription drum 221, is provided in such a manner that the cleaner is capable of being controlled to contact or be separated from the outer surface of the intermediate transcription drum 221. In order to generate a base position signal TPS for the intermediate transcription drum 221, a base position mark is formed on the outer surface of the intermediate transcription drum 221, and a reflection type photo-sensor 224 is provided to read the mark. Further, the outer surface of the intermediate transcription drum 221 is constructed such that the reflection scanning start base signal BDT1 output from the scanning exposing unit 213 is always generated an integral number of times in the interval in which the intermediate transcription drum 221 rotates once.

A cassette 231 contains paper 232, and a paper feed roller 233 extracts the paper 232 to supply it up to a register roller 234. The register roller 234 holds down the top front of the paper 232 transmitted from the paper feed roller 233 to stop the paper 232 and to rearrange the paper and adjust the feed timing thereof.

The transcription unit 241 charges a transfer charge onto the back surface of the paper 232 at the region where the paper 232 transmitted from the register roller 234 contacts the intermediate transcription drum 221, so as to transfer the toner image on the outer surface of the intermediate transcription drum to said the paper 232.

A fixing unit 251 is constructed such that the paper 232 on which the toner image has been transferred is passed through a heating roller and a pressurizing roller to deposit (or fix) the toner onto the paper 232.

A paper discharge roller 261 discharges the paper 232 on which the toner image has been fixed out of the machine.

A control unit 270 is connected to the information processor 100 to communicate with the information processor to obtain control information and print data (video data) and to perform printing control by controlling various composing means inside the laser printer 200.

Figure 3:
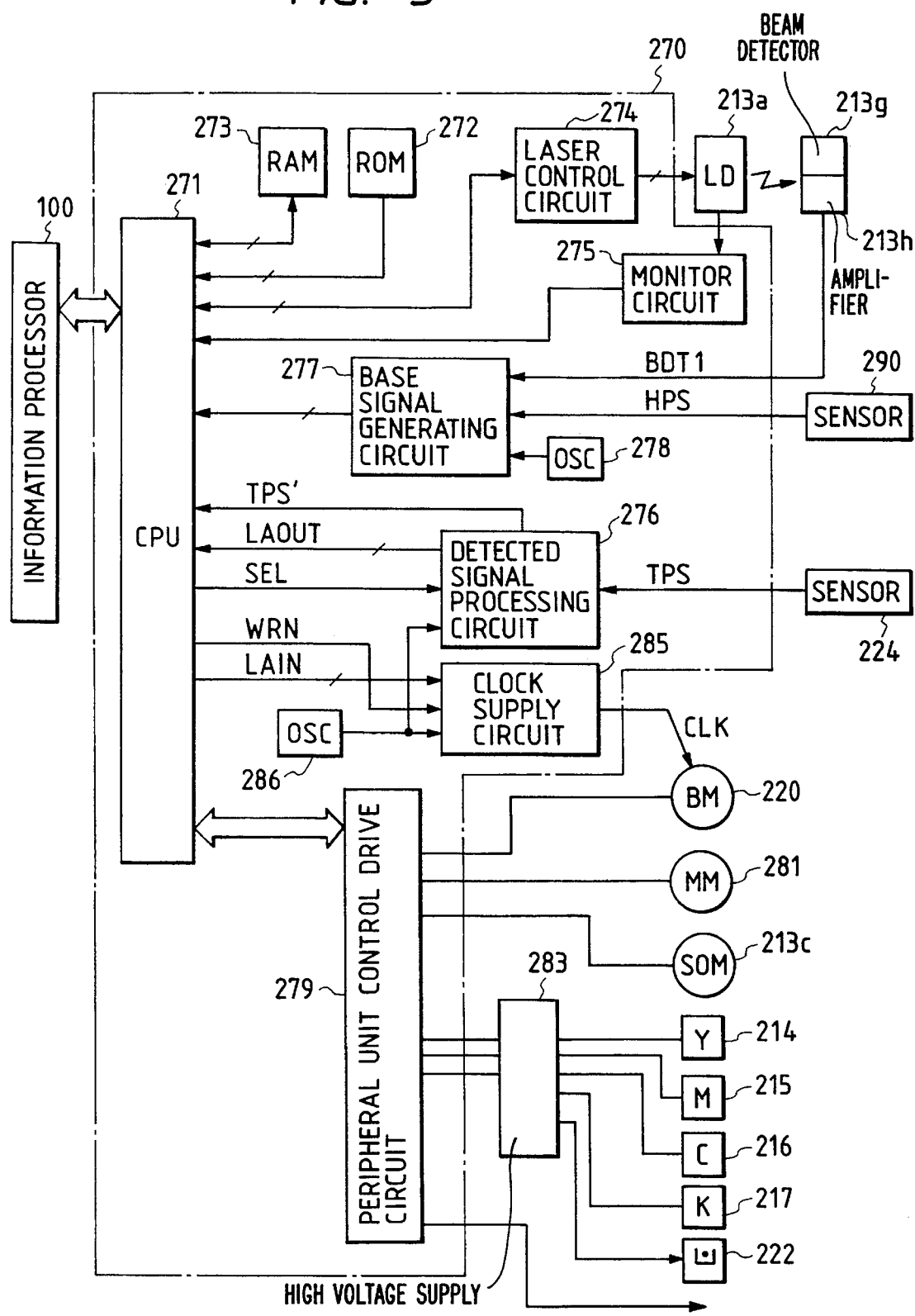
FIG. 3 is a block diagram of the control unit of a color laser printer according to the present invention.

FIG. 3 is a block diagram showing the internal construction of the control unit 270 in detail. The control unit 270 comprises a central processing unit 271 operating as a main control element, a read-only memory 272 to store programs, and a random access memory 273 to store error information and maintenance information. A laser control circuit 274 operates to control flashing of a semi-conductor laser 213a, and a laser power monitor circuit 275 operates to detect the intensity of the laser beam. A scanning synchronizing base signal generating circuit 277 operates to generate a scanning synchronizing base signal based on the reflection scanning start base detection signal BDT1 the base position signal HPS in the sub-scanning direction, and the output of an oscillator 278. A detected signal processing circuit 276, which represents an intermediate transcription drum rotating speed measuring means, operates to measure the rotating speed of said intermediate transcription drum 221 by inputting said intermediate transcription drum base position signal TPS. A clock supplying circuit 285, which represents a photosensitive belt driving motor rotating speed adjusting means, is controlled by the central processing unit 271 to regulate the rotating speed of the photosensitive driving means (motor) by inputting a base clock signal used as a base for the rotating speed of the photosensitive belt driving means from an oscillator 286. A peripheral unit control driving circuit 279 operates to control composing means inside said laser printer.

The composing means inside the laser printer, shown in FIG. 3, includes the mirror motor 213c for driving a polygon mirror 213d, a main motor 281 to drive a paper transmitting system, a photosensitive belt driving motor 220 for driving the photosensitive belt 211, a high voltage supply 283 to charge the developing units 214, 215, 216 and 217 and the transcription unit 222.

Print control processing executed by the central processing unit 271 will be described below with reference to FIG. 4 to FIG. 6. The control program is programmed in such a manner that the information processor 100 and the laser printer 200 form toner images in the order of yellow, magenta, cyanine blue and black.

When the information processor 100 generates a print request signal, the central processing unit 271 in the controller 270 for the laser printer 200 responds to the print request signal by starting print control processing based on the control program stored in the read-only memory 272.

Firstly, in the process 401, the mirror motor 213c, the main motor 281 and the photosensitive belt driving motor 220 are started, the erase lamp 219 is turned on in the process 402, the electro static charge unit 212 is brought into operating condition in the process 403, and the transcription unit 222 is brought into operating condition in the process 404.

In the process 405, it is judged whether the video data input from the information processor 100 corresponds to a yellow toner image. When it corresponds to a yellow toner image, the peripheral unit control driving circuit 279 is controlled so as to generate a developing bias voltage to make the developing function of the developing unit 214 effective in the process 406, and then the processing proceeds to the printing process 407.

Figure 5:
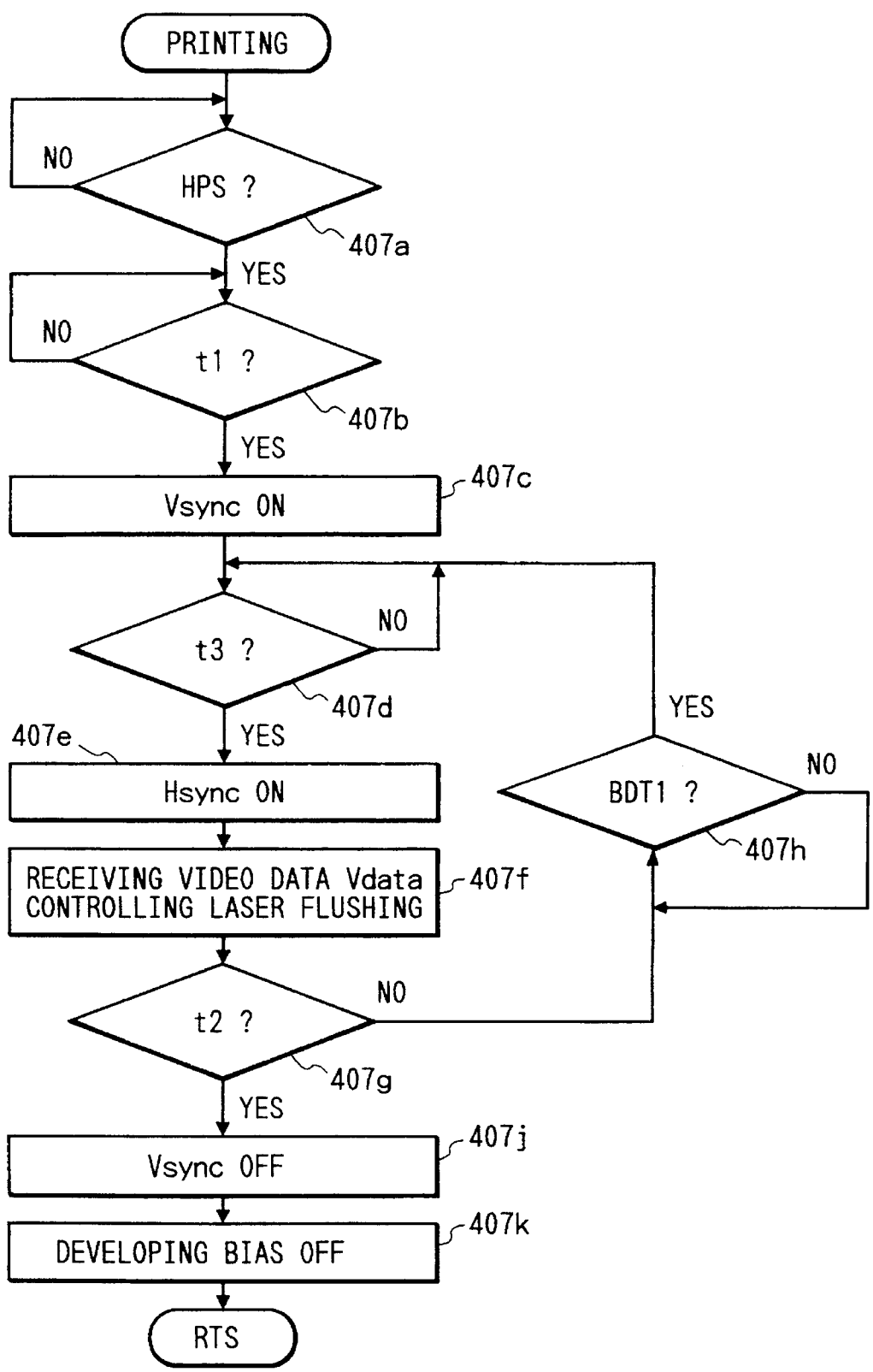
FIG. 5 is a flow chart of print processing in the flow chart of control processing shown in FIG. 4.
Figure 6:
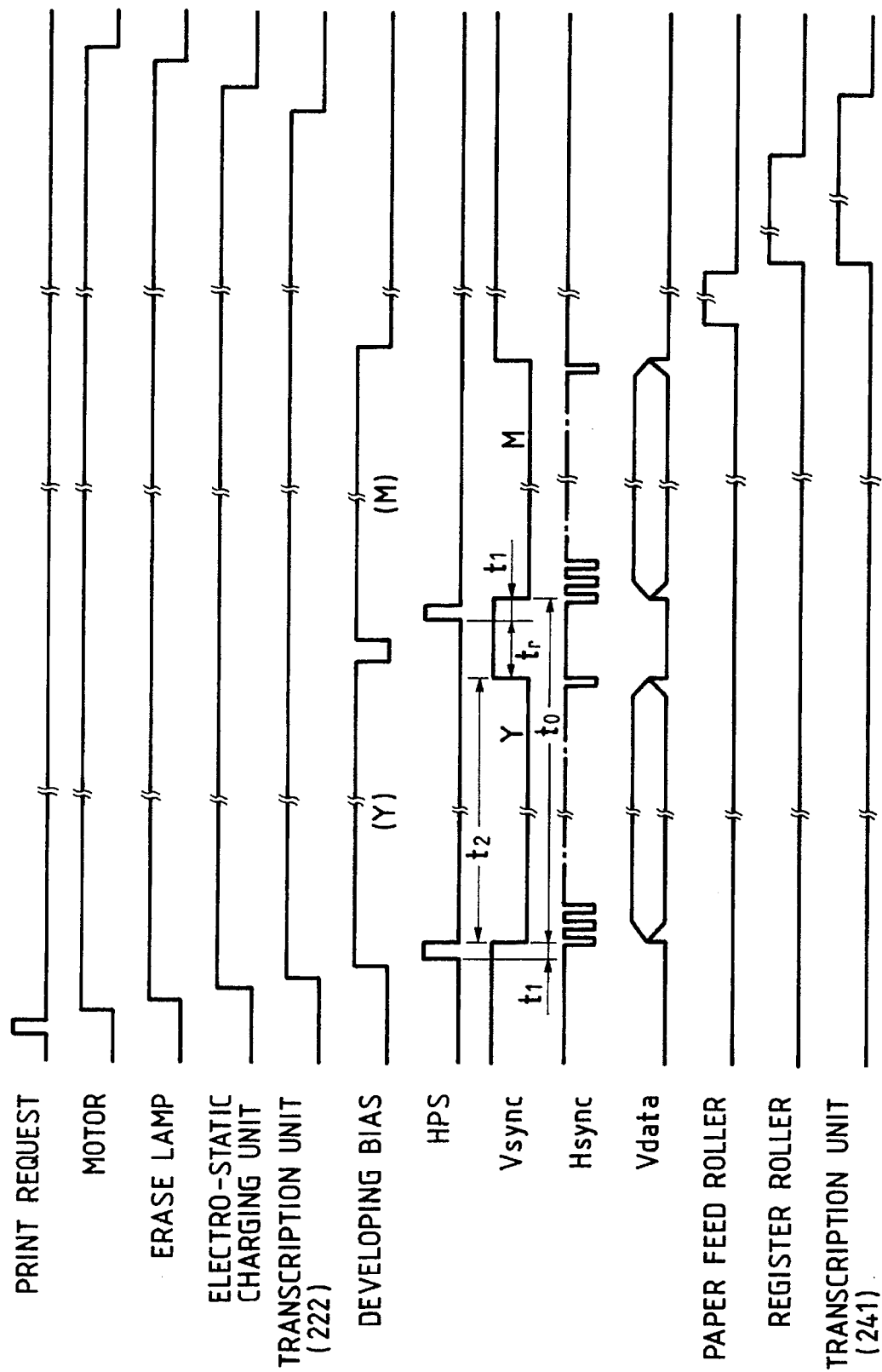
FIG. 6 is a time chart of print control by the control unit in a color laser printer according to the present invention.

In the printing process 407, as described in FIG. 5 in detail, inputting of the base position signal HPS in the sub-scanning direction on the outer surface of the photosensitive belt is watched for in the process 407a. When the photosensitive belt 211 rotates up to the read-out base position and the sub-scanning direction base signal HPS is generated, the processing proceeds to the process 407b. In the process 407b, time management is performed in such a manner that a print permission signal $V_{sync}$ in the sub-scanning direction is generated t1 seconds after the generation of the sub-scanning direction base position signal HPS. When the time of t1 seconds elapses, the sub-scanning direction print permission signal $V_{sync}$ is generated in the process 407c (the signal line to transmit the sub-scanning direction print permission signal $V_{sync}$ to the information processor 100 is brought to low level). This time management is performed by counting the sub-scanning synchronizing base signal BDT1. The interval t2 to generate the sub-scanning direction print permission signal $V_{sync}$ corresponds to the time required to transmit the paper 232, according to the length of the paper, in the transmitting direction.

During generating of the sub-scanning direction print permission signal $V_{sync}$, in the process 407d, the time management is performed in such a manner that a main scanning synchronizing base signal $H_{sync}$ is generated t3 seconds after the generation of the main scanning synchronizing base signal DBT1. When the time of t3 seconds elapses, the main scanning direction print permission signal $H_{sync}$ is generated in the process 407e (the signal line to transmit the main scanning direction print permission signal $H_{sync}$ to the information processor 100 is brought to low level). The interval t4 to generate the main scanning direction print permission signal $H_{sync}$ corresponds to the time required to scan the paper 232 according to the width of the paper.

Then, the processing moves to the process 407f, wherein the video data $V_{data}$, which is transmitted from the information processor 100 in synchronism with the sub-scanning print permission signal $V_{sync}$ and the main scanning direction print permission signal $H_{sync}$, is received and transmitted to the laser control circuit 274 to control flashing of the semiconductor laser 213a. By this flashing of the semiconductor laser, one scanning line of an electrostatic latent image is formed on the photosensitive belt 211.

After completing reception of the video data $V_{data}$ and controlling the semiconductor laser flashing for one scanning line, it is judged in the process 407g whether it is within the interval t2 for the sub-scanning direction print permission signal $V_{sync}$ generation. When it is within the interval t2 for the sub-scanning direction print permission signal $V_{sync}$ generation, the next generation of the main scanning synchronizing base signal BDT1 is watched for in the process 407. When the main scanning synchronizing base signal BDT1 is generated, the processing returns to the process 407d.

When the interval t2 for the sub-scanning direction print permission signal $V_{sync}$ generation has elapsed, the sub-scanning direction print permission signal $V_{sync}$ is returned to high level to finish the exposing process for the yellow toner image in the process 407j. Then, in the process 407k, the developing bias voltage is controlled so as to eliminate the developing function of the developing unit 214 after finishing the developing of the electrostatic latent image formed by the exposure.

Therewith, the yellow toner image as formed is transferred to the outer surface of the intermediate transcription drum 221 when the yellow toner image contacts the intermediate drum 211, and is held on the outer surface.

Next, in the process 408, it is judged whether the video data input from the information processor 100 corresponds to a magenta toner image. When it corresponds to a magenta toner image, the peripheral unit control driving circuit 279 is controlled so as to generate a developing bias voltage to make the developing function of the developing unit 215 effective in the process 409, and then the processing proceeds to the printing process 410. In the printing process 410 for the second color, the left time tr, which is remained for the intermediate transcription drum 221 to rotate one complete cycle, is managed the instead of managing waiting process for inputting the sub-scanning direction base position signal HPS at the process 407a in the printing process 407 described above (the time when the intermediate transcription drum 221 rotates one cycle is t0, tr=to−t1−t2). Then, the processing after following the process 407b is performed. Similar to the process 407, the magenta toner image is also transferred to the outer surface of the intermediate transcription drum 221 so as to superpose be superposed on the yellow toner image, and is held on the outer surface.

Next, in the process 411, it is judged whether the video data input from the information processor 100 corresponds to a cyanine blue toner image. When it corresponds to a cyanine blue toner image, the peripheral unit control driving circuit 279 is controlled so as to generate a developing bias voltage to make the developing function of the developing unit 216 effective in the process 412, and then the processing proceeds to the printing process 413. Similar to the process 410, the cyanine blue toner image is also transferred to the outer surface of the intermediate transcription drum 221 so as to be the yellow toner image and the magenta toner image, and is held on the outer surface.

Similar to the above, in the process 430, it is judged whether the video data input from the information processor 100 corresponds to a black toner image. When it corresponds to a black toner image, the peripheral unit control driving circuit 279 is controlled so as to generate a developing bias voltage to make the developing function of the developing unit 217 effective in the process 431, and then the processing proceeds to the printing processes 432. Similar to the process 410 and 413, the black toner image is also transferred to the outer surface of the intermediate transcription drum 221 so as to be superposed on the yellow toner image, the magenta toner image and the cyanine blue image, and is held on the outer surface. Since this embodiment deals with a case where the cyanine blue toner image and the black toner image are not used, the processing jumps from the process 411 to the process 414.

In order to transfer the toner image formed on the outer surface of the intermediate transcription drum 221 in the manner described above to the paper 232, the paper feed roller 233 is rotated to extract the paper 232 in the process 414, the rotation is continued for an interval of t5 seconds in the process 415 to feed the paper 232 up to the register roller 234, and the rotation of the paper feed roller 233 is stopped in the process 416.

Then, in the process 417, the register roller 234 is started to rotate with a paper feed timing such that the paper 232 contacts the intermediate transcription drum 221 at a predetermined position relative to the toner image. In the process 418, the transcription unit 241 is activated at the time when the top front of the paper 232, transported by the register roller 234, contacts the intermediate transcription drum 221 to electrostatically transfer the toner image on the outer surface of the intermediate transcription drum 221 to the paper 232.

Thereby, the toner image is transferred to the paper 232, the toner image is fixed on the paper 232 when the paper 232, on which the toner image has been transferred, passes through the fixing unit 251, and the paper is discharged out of the machine by the paper discharge roller 261.

The register roller 234, after finishing the transporting of the paper, is stopped in the process 419. The transcription unit 222, after finishing its transcribing operation is stopped by cut-off of the supply of electric power thereto in the process 420. The transcription unit 241 after finishing its transcribing operation is stopped by cut-off of the supply of electric power thereat in the process 421, and the cleaner 223 is activated to start removing the remaining toner on the outer surface of the intermediate transcription drum 221 in the process 422. The electrostatic charging unit 212, after finishing the charging of the belt 112 is stopped by cut-off of the supply of electric power in the process 423, and the erase lamp 219, after finishing erasing the remainder of charge is turned out in the process 424. The cleaner 223, after finishing removing the remainder of toner is inactivated in the process 425, and the various motors are stopped in the process 426.

Figure 7:
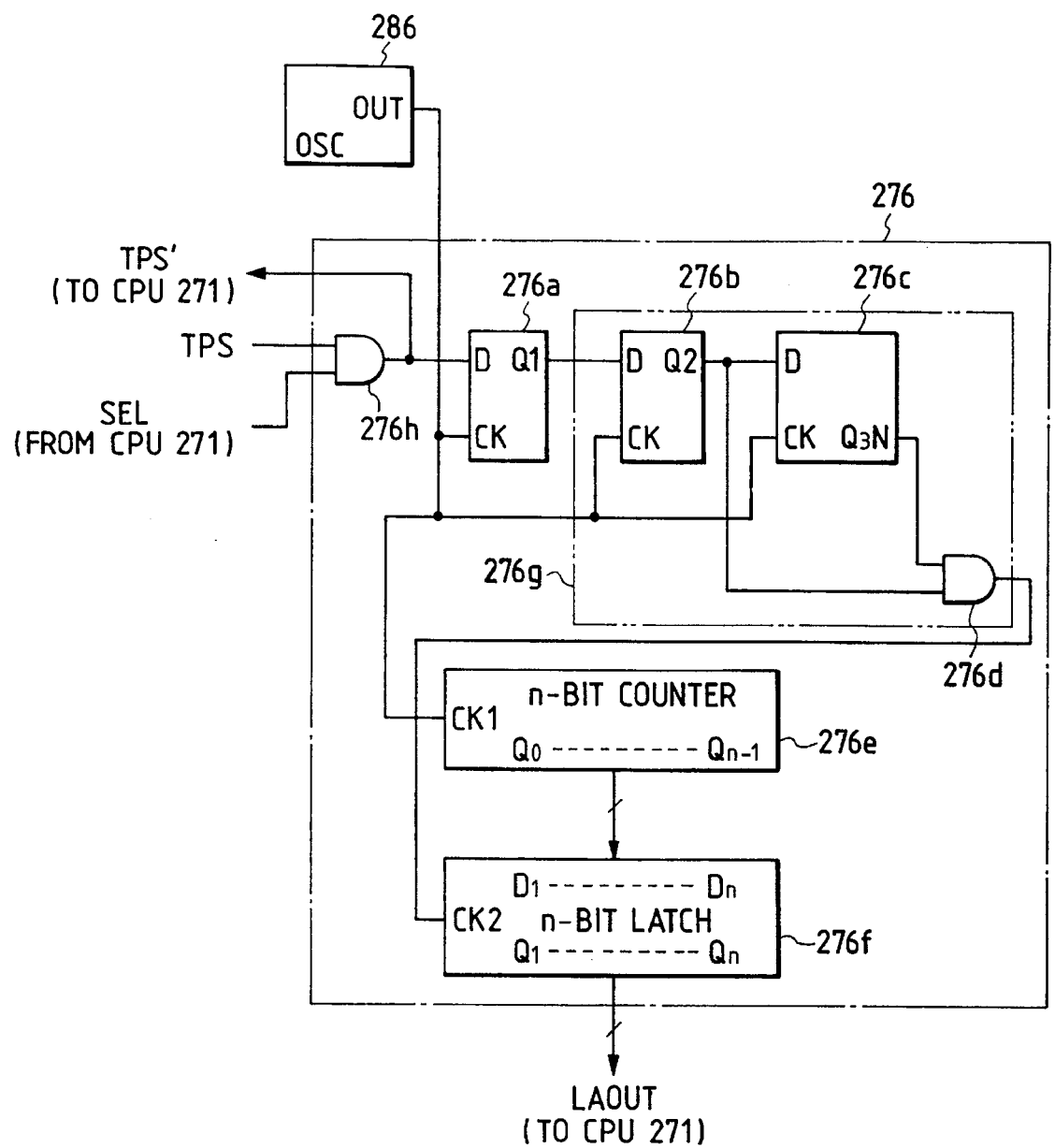
FIG. 7 is a block diagram of the detected signal processing circuit in the control unit of a color laser printer according to the present invention.

FIG. 7 shows the internal construction of the detected signal processing circuit 276, which represents an intermediate transcription drum rotating speed measuring the means to measure rotating speed of the intermediate transcription drum using the intermediate transcription drum base position signal TPS. The detected signal processing circuit comprises an AND circuit element 276h which operates to determine whether the intermediate transcription drum base position signal TPS is output to the following circuits based on the selection signal SEL from the central processing unit 271, a D-type flip-flop 276a which operates to synchronize the internal circuit with the base position signal TPS, and D-type flip-flops 276b and 276c and an AND circuit element 276d forming a differential circuit 276g, an n-bit counter 276e and an n-bit latch 276f. The D-type flip-flop 276a synchronizes the intermediate transcription drum base position signal TPS', after passing through the AND circuit element 276h, with a clock signal and outputs it to the differential circuit 276g. The differential circuit 276g detects the leading edge of the input signal and outputs a one cycle output signal of the oscillator 286 to the control terminal KC2 in the n-bit latch 276f.

The n-bit counter 276e is a free running counter in which each of the output terminals $Q_0$ ... are connected to each of the input terminals $D_1$ ... in the n-bit latch 276f. The n-bit latch 276f holds the counted value of the n-bit counter 276e in synchronism with the build-up of the signal input to the control terminals CK2 from the differential circuit 276g. The output terminals $Q_1$ ... (LAOUT) of the n-bit latch 276f are connected to the central processing unit 271. The intermediate transcription drum base position signal TPS' is also input to the central processing unit 271. The central processing unit 271 measures the rotating cycle of the intermediate transcription drum 221 using the output data from the n-bit latch 276f every time the intermediate transcription drum base position signal TPS' is input and calculates the difference between successive rotating cycles.

Therein, the AND circuit element 276h outputs the information on the base position signal TPS only when the selecting signal SEL from the central processing unit 271 is at the H-level. And, when the selecting signal SEL from the central processing unit 271 is at the L-level, the output is fixed. In this way, the measuring of the rotating cycle of the intermediate transcription drum 221 can be voluntarily performed or paused with the central processing unit 271.

Figure 8:
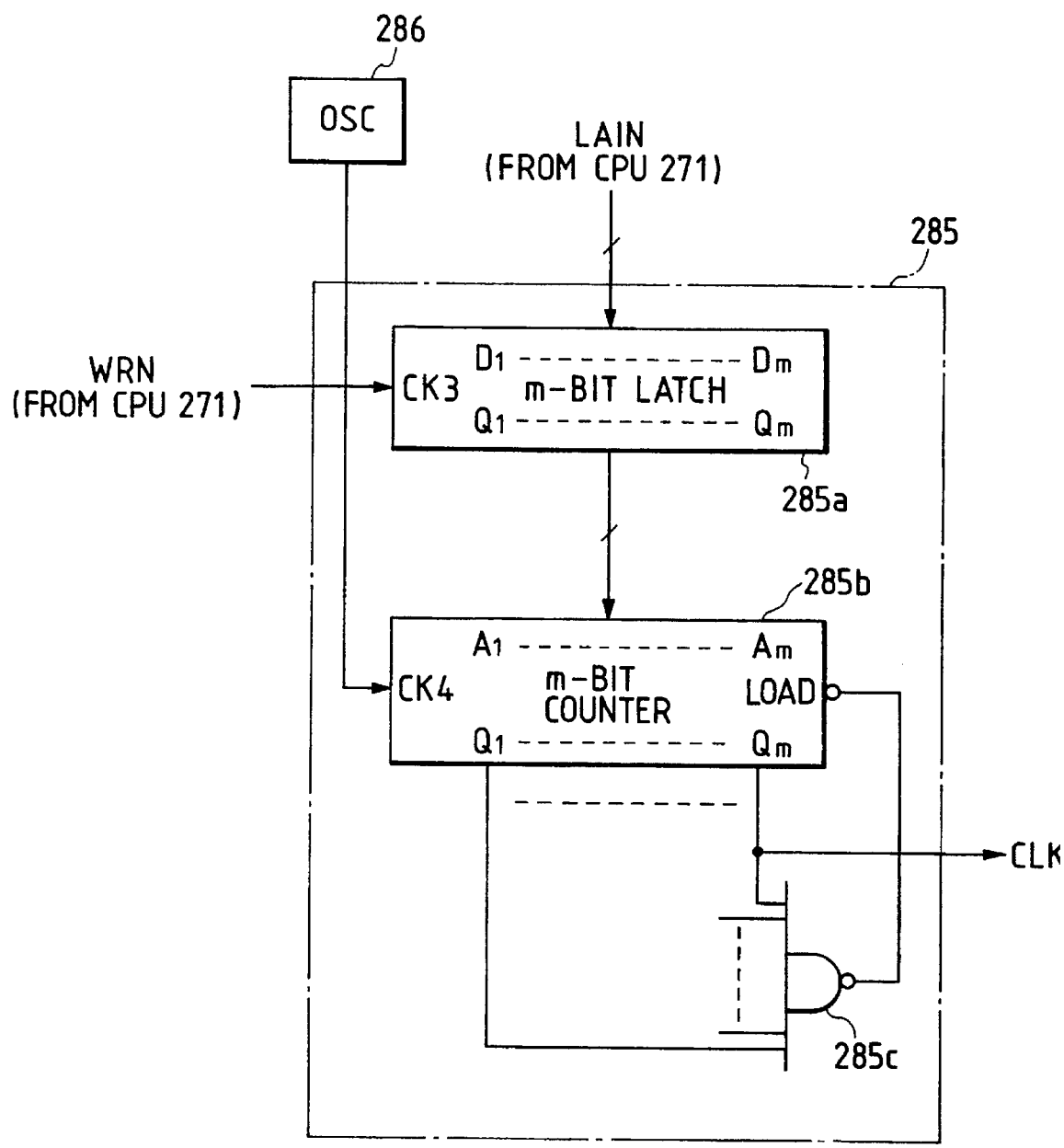
FIG. 8 is a block diagram of the clock supply circuit in the control unit of a color laser printer according to the present invention.

FIG. 8 shows the internal structure of the clock supply circuit 285, which represents a photosensitive belt driving motor rotating speed adjusting means for adjusting the photosensitive belt driving motor 220 using the base clock signal as a rotating speed target for the photosensitive belt driving motor 220, which operates at the photosensitive belt driving means. The clock supply circuit comprises an m-bit latch 285a, an m-bit counter 285b and an m-input NAND circuit element 285c. The input terminals $D_1$ ... and the control terminal CK3 of the m-bit latch 285a are, as shown in FIG. 3, connected to the central processing unit 271, and the m-bit latch holds the control data LAIN input to the input terminals $D_1$ ... and outputs this data to the output terminals $Q_1$ ... in synchronization with the build-up of the input signal WRN. The output terminals $Q_1$ ... of the m-bit latch 285a are connected to the data input terminals $A_1$ ... of the m-bit counter 285b, and the output data from the m-bit latch 285a is loaded to the m-bit counter 285b in synchronization with the build-up of the clock signal input to the control terminal CK4, when the control terminal LOAD is at the L-level. The output terminals $Q_1$ ... of the m-bit counter 285b are connected to the m-input NAND circuit element 285c, and the output terminal of the m-input NAND circuit element 285c is connected to the control terminal LOAD of the m-bit counter 285b.

The operation of the clock supply circuit 285 is as follows. When the m-bit counter 285b counts up and all of the output signals at the output terminals $Q_1$ ... become H-level, the output signal of the m-input NAND circuit element 285c becomes L-level, the control terminal LOAD of the m-bit counter 285b becomes L-level, and the values held in the m-bit latch 285a are loaded into the m-bit counter 285b. When the data is loaded, the output signal of the m-input NAND circuit element 285c becomes H-level, and the m-bit counter 285b restarts counting up from the data loaded. That is, supposing that the value held in the m-bit latch 285a is N, the m-bit counter 285b operates as an N-radix counter. Further, when the uppermost bit of the output signals of the output terminals $Q_1$ ... in the m-bit counter 285b is used as the clock signal, a base clock signal CLK having a cycle of Nx (input clock cycle) and a duty of approximately 50% can be generated. Therefore, the cycle of the base clock signal CLK can be arbitrarily set according to the content of the control data LAIN input to the m-bit latch 285a, and the rotating speed of the photosensitive belt driving motor 220 can be adjusted. Since the content of the control data LAIN input to the m-bit latch 285a is changed by the central processing unit 271, the rotating speed adjustment can arbitrarily be performed or paused by the central processing unit 271.

Figure 9:
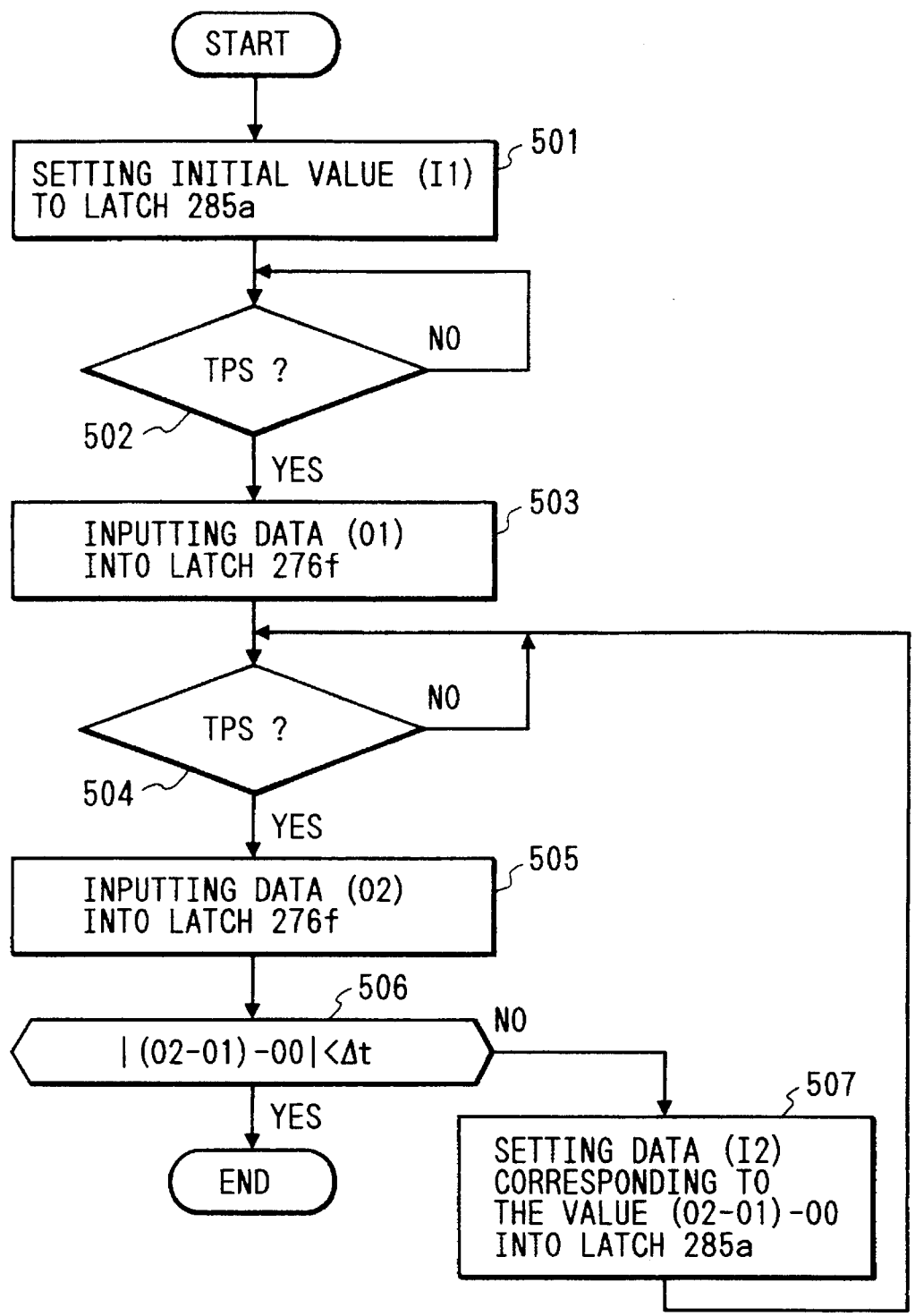
FIG. 9 is a flow chart of the photosensitive belt driving motor speed control regulation processing executed by the central processing unit in the control unit of a color laser printer according to the present invention.
Figure 10:
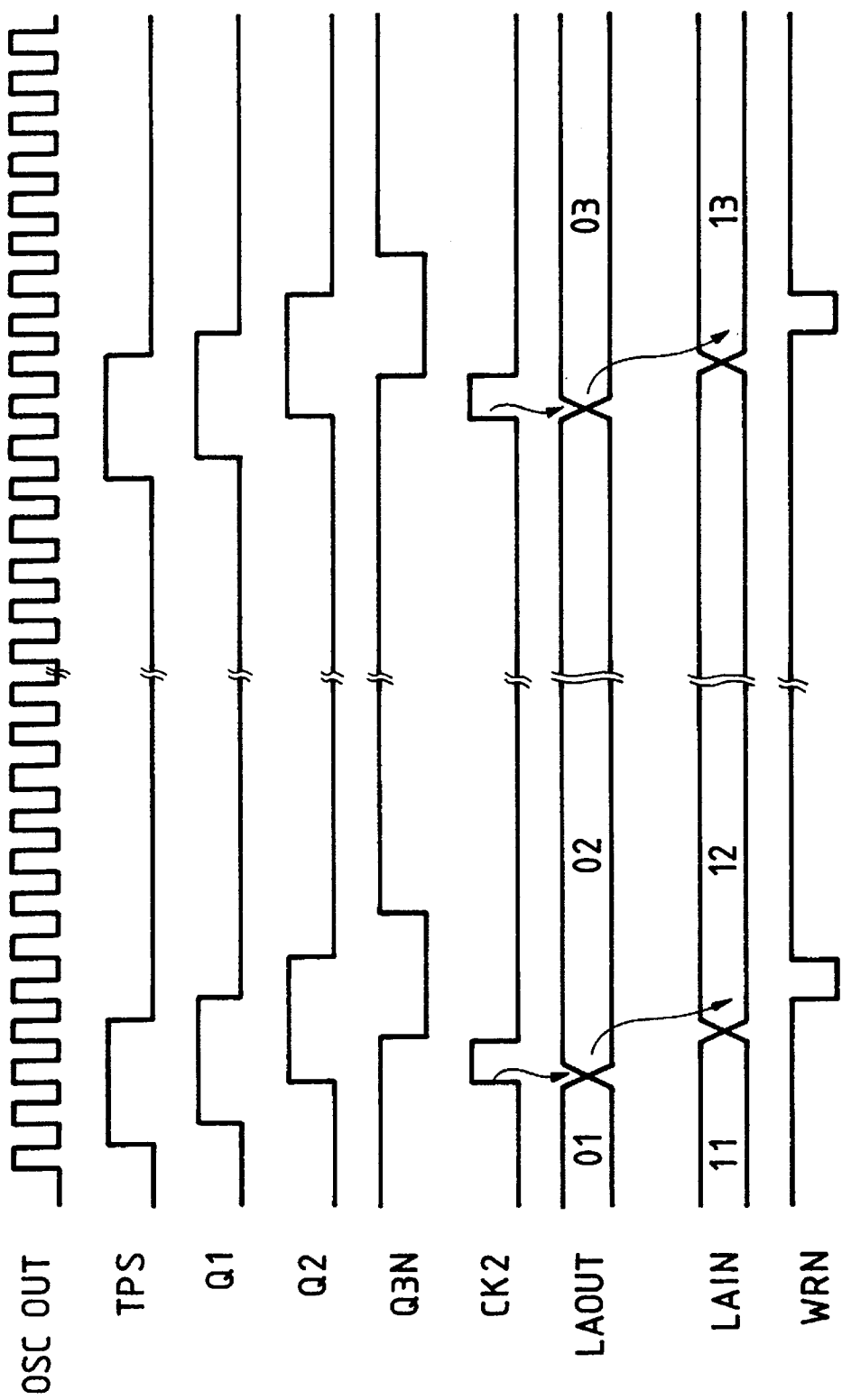
FIG. 10 is a time chart of the photosensitive belt driving motor speed control performed by the control unit of a color laser printer according to the present invention.

The control processing executed by the central processing unit 271 using the detected signal processing circuit 276 and the clock supply circuit 285 will be described below with reference to FIG. 9 to FIG. 11, wherein the detected signal processing circuit 276 measures the rotating speed of the intermediate transcription drum using the intermediate transcription drum base position signal TPS, and the clock supply circuit 285 generates the base clock signal CLK which serves as a target for the rotating speed of the photosensitive belt driving motor 220.

When the photosensitive belt driving motor 220 for driving the photosensitive belt 211 is operating, the intermediate transcription drum 221 is driven by the photosensitive belt 211 by means of the friction force and the electrostatic adsorption force which exists between the contact portion 301 and the photosensitive belt 211, such that the circumferential speed of the photosensitive belt 211 is synchronized with the circumferential speed of the intermediate transcription drum 221.

When the photosensitive belt driving motor 220 is operating, the central processing unit 271 sets an initial value I1 into the m-bit latch 285a in the clock supply circuit 285 using the control data LAIN in the process 501. (The initial value I1 is a calculated value of Vt, wherein the rotating speed of the photosensitive belt 211 becomes Vt when one rotating cycle of the intermediate transcription drum 221 is t0.)

In the process 502, the inputting of the base position signal TPS generated according to the rotation of the intermediate transcription drum 221 is being watched for. When the base position signal TPS is input, the processing goes to the process 503.

In the process 503, the output data LAOUT(O1) from the n-bit latch 276f is input as an initial value for intermediate transcription drum rotating cycle measuring. In the process 504, inputting of the base position signal TPS according to the rotation of the intermediate transcription drum 221 is being watched for as well. When the base position signal TPS is input, the processing proceeds to the process 505. In the process 505, the output data LAOUT(O2) from the n-bit latch 276f is also input.

In the process 506, the difference between the output data LAOUT(O1) obtained formerly and the output data LAOUT(O2) obtained most recently is calculated to determine any discrepancy between the calculated value and the value (O0) corresponding to the one rotating cycle t0 of the intermediate transcription drum 221 (O0=t0/the clock signal cycle of the oscillator 286).

When the discrepancy is larger than a predetermined value Δt (for example, a value corresponding to 1/16 of the scanning line pitch), the processing goes to the process 507. In the process 507, new control data LAIN of value (I2) (a calculated value or a table value) is input to the m-bit latch 285a in the clock supply circuit 285 so as to lessen Δt depending on the magnitude of the discrepancy obtained in the process 506 in order to perform a fine adjustment in the rotating speed of the photosensitive belt driving motor 220. The processing returns to the process 504 having the output data (O2) obtained in this time as new output data (O1). Thereafter, the above process is repeated until the discrepancy becomes less than Δt, and this processing ends when the discrepancy is less than Δt. With this control processing, the intermediate transcription drum 221 rotates at a given speed.

Figure 4:
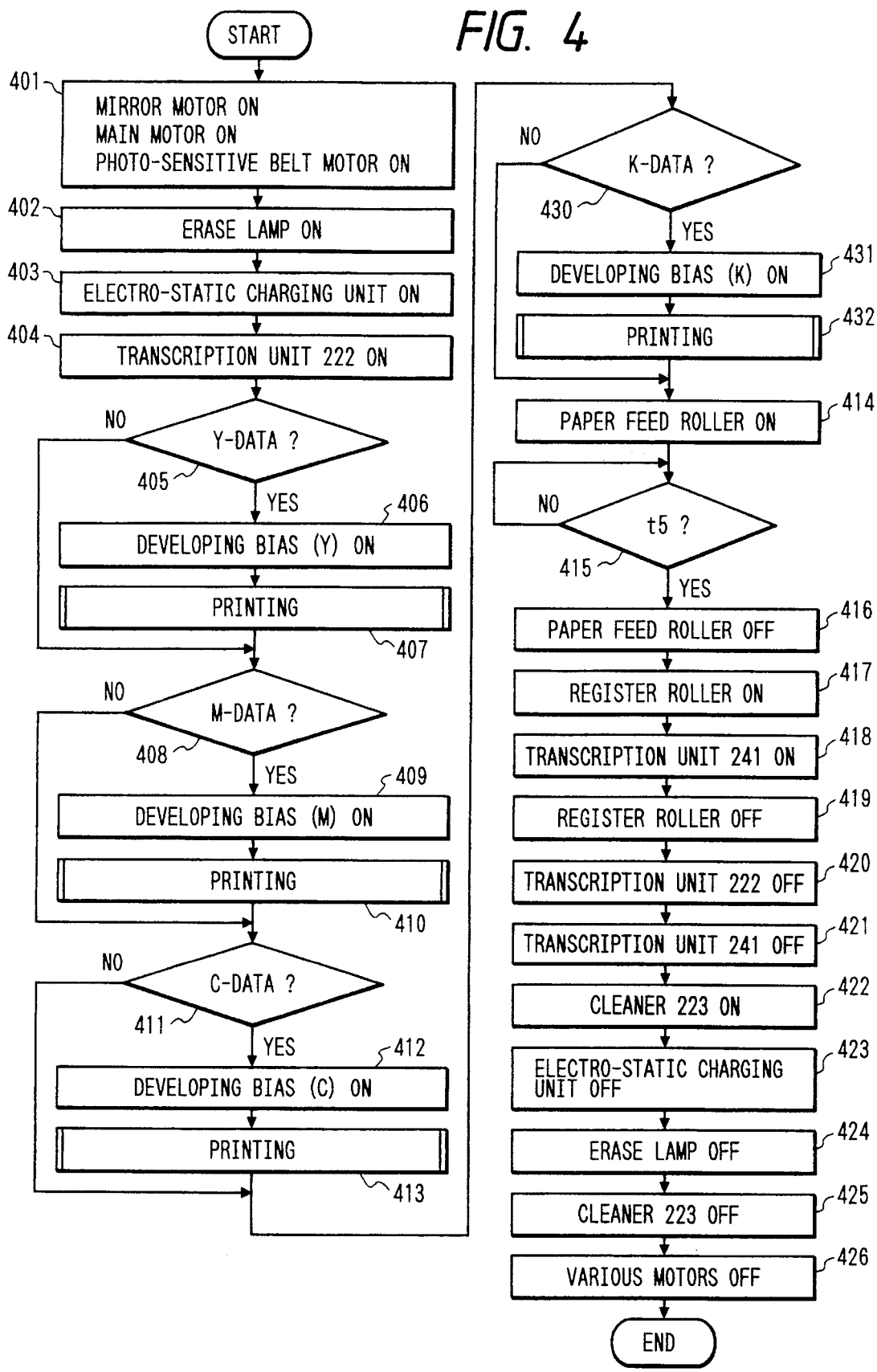
FIG. 4 is a flow chart of control processing executed by the central processing unit in the control unit of a color laser printer according to the present invention.

The process described above is executed in the interval, such as in an initial process (process for mainly confirming operation of motor, high voltage supply, clutch and the like) at printer power switching-on or after completion of maintenance due to error occurrence, wherein the peripheral devices are operated under a condition outside the print control process to form an electrostatic latent image on the photosensitive belt, in the paging interval during printing a plurality of pages, or during the time for the process 401, shown in FIG. 4, before the print control unit has received a print request from the information processor 100.

Figure 12:
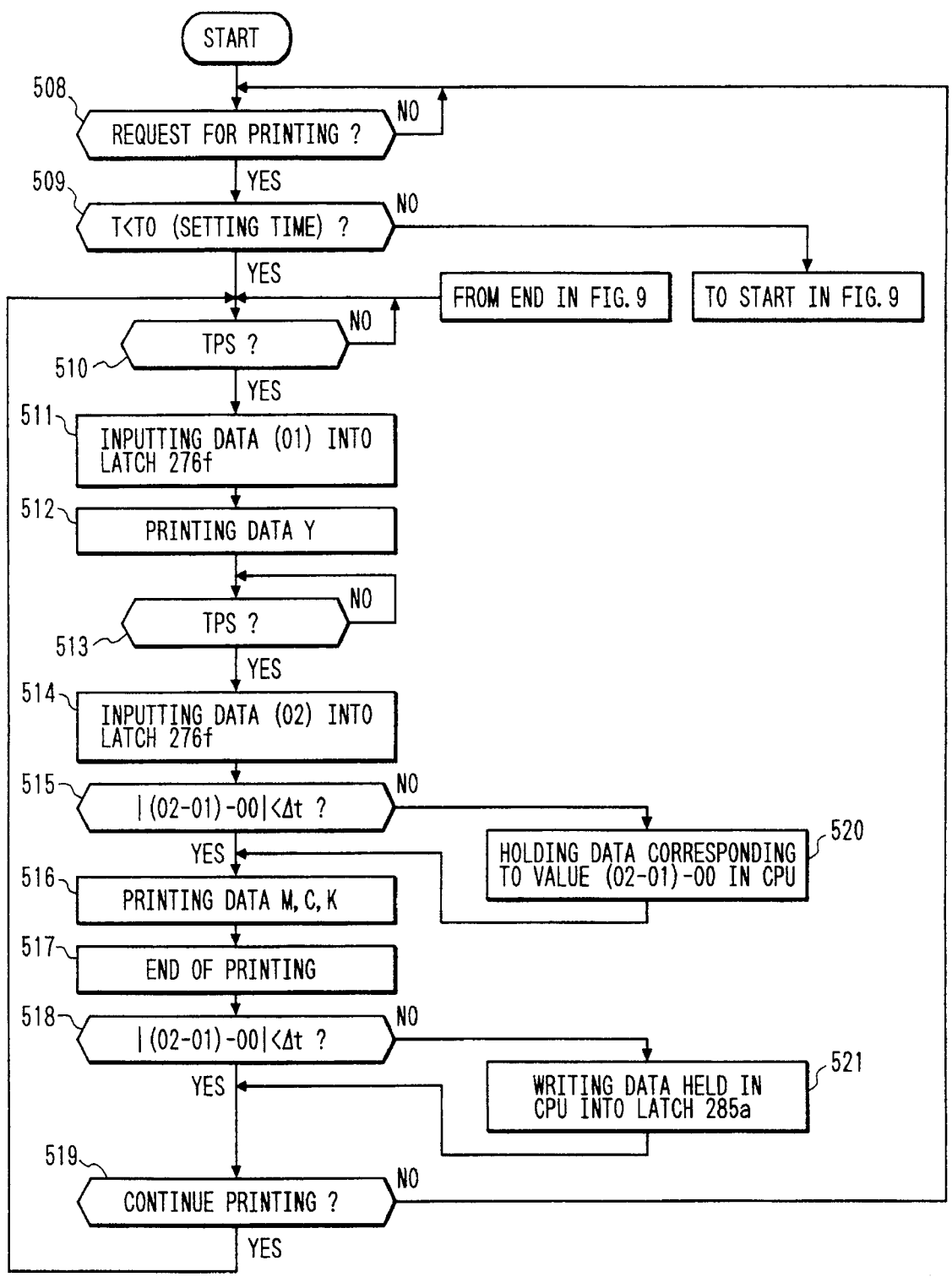
FIG. 12 is a flow chart of the printing control performed by the control unit of a color laser printer according to the present invention when it receives a printing request signal from an information processing unit.

Printing control when the control unit receives a printing request signal from the information processor 100 will be described below with references to the control flow chart in FIG. 12. A printing request signal is received from the information processor 100 in step 508, and then processing goes to process 509. In process 509, the elapsed time T from the initial time or the end of the preceding page printing operation is compared with a given time T0 to judge whether the elapsed time exceeds the given time or not. When the elapsed time exceeds the given time T0, the initial process in FIG. 9 is executed, and then processing goes to process 510. When the elapsed time is within the given time T0, processing goes to process 510 without executing the initial process. In process 510, a base position signal TPS from the intermediate transcribing drum 221 is watched for, and processing goes to process 511 when the base position signal TPS is detected. In process 511, output data (O1) from the n-bit latch 276f is input as an initial value for measuring the rotating speed of the intermediate transcribing drum, and the the processing goes to process 512. In process 512, a printing process sequence for the first color data (yellow in this embodiment; Y) is executed, and then processing goes to process 513. In process 513, the base position signal TPS from the intermediate transcribing drum 221 is again watched for, and processing goes to process 514 when the base position signal TPS is detected. In the process 514, the output data (O2) from the n-bit latch 276f is input.

In process 515, the difference between the data (O1) input previously and the data (O2) input at this time is calculated to obtain the differential amount of value O0 corresponding to the time for one cycle of the intermediate transcribing drum (O0=t0/clock cycle of the oscillator 286). When the obtained differential amount is larger than a value Δt determined in advance (for example, a value corresponding to 1/16 of the scanning line pitch), processing goes to process 520. In process 520, a calculation is executed according to the differential amount obtained in process 515 in order to obtain data for writing a proper value (calculated value, tabulated value or the like), which is such that the differential amount becomes smaller than Δt, into the m-bit latch 285a in the clock supply circuit 285. And, the data is held in a register in the central processing unit 271, and then processing goes to process 516. In process 516, the data printing processes for the second, third and fourth colors are performed; and, in process 517, the entire printing process is completed, and so processing goes to process 518. In a case where processing has passed through the process 520, in process 518, the data held in the register in the central processing unit 271 is written in the m-bit latch 285a in the clock supply circuit 285, and the rotating speed of the motor 219 for the photosensitive belt is fine adjusted, after which processing goes to process 519. Judgement is executed on whether printing is continued or not in process 519. If printing is continued, processing goes to process 510. If not, or when printing of the requested number of sheets is completed, processing goes to process 508.

With the processing described above, the quality of the image is improved, since a change in the pitch between rasters due to deformation of the photosensitive member and the intermediate transcribing member caused by the environment, such as a temperature change, is corrected for every printing page, and the printing speed in continuous printing is not deteriorated, since the correcting data to adjust the speed of the photosensitive belt motor 219 is always obtained during the time of the preceding data printing process for the first color (in a case where the correcting data is obtained between pages and the speed of the photosensitive belt motor is adjusted, the printing speed in continuous printing is decreased by a corresponding amount).

Incidentally, when a mechanical slip occurs between the photosensitive belt 211 and the driving mechanism, the one rotating cycle of the photosensitive belt 211 changes. This is caused by wear or fatigue in mechanical parts due to long use of the printer, and it is easily expected that it changes with time. In addition to this, since the toner images, i.e. the toner image for first color, the toner image for second color and so on, are successively superposed on the intermediate transcription drum 221, the apparent outer diameter of the intermediate transcription drum 221 increases due to an increase in the thickness of the toner image, such that the second toner image is thicker than the first one, the third one is thicker than the second one, and so on. For this reason, even though the intermediate transcription drum 221 is rotated at the same rotating speed (the speed adjusted in the process 401) and for the same duration (the time duration in which the main scanning synchronizing base signal BDT1 is generated a certain integral number of times) throughout all colors, a point on the intermediate transcription drum 221 does not return to the same position for every color. Although it is desirable that the above process is executed during the print process, the adjusting control processing carried out during the image forming might cause a disturbance in the speed.

Figure 11:
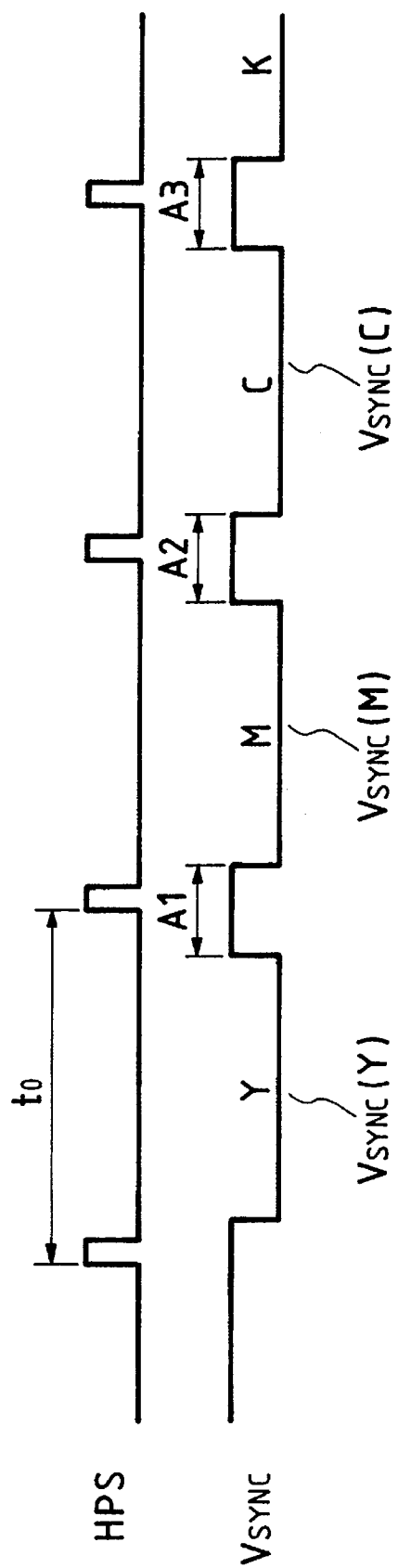
FIG. 11 is a time chart of the photosensitive belt driving motor control performed during print processing by the control unit of a color laser printer according to the present invention.

FIG. 11 is a time chart showing a preferable embodiment in which the above process is executed during the print process. As shown in the figure, in the interval for the sub-scanning direction print permission signal $V_{sync}(Y)$, wherein the electrostatic latent image for the first color (yellow in this embodiment) is formed and developed to obtain and transfer the toner image onto the intermediate transcription drum 221 (this interval can be managed with the central processing unit 271), the speed measuring process is executed using the data (O1), obtained from a former rotation of the intermediate transcription drum 221, as described above, and data (O2) measured in this time. And, in the non-print region A1 prior to processing the next color (between the process 409 and the process 410 in FIG. 4), an adjustment (change) in the set value of the speed control data LAIN for the photosensitive belt driving motor 220 is performed. In the interval for the sub-scanning direction print permission signal $V_{sync}(M)$, wherein the toner image for the second color is formed and transferred, the speed measuring process is executed. And, in the non-print region A2 prior to processing the next color (between the process 412 and the process 413 in FIG. 4), the adjustment in the set value of the speed control data LAIN for the photosensitive belt driving motor 220 is performed. Similarly, in the interval for $V_{sync}(C)$ for the third color, the speed measuring process is executed. And, in the interval A3 (between the process 431 and the process 432 in FIG. 4), the adjustment is performed.

As described above, the problem in outer diameter change of the intermediate transcription drum 221 during every rotation can be solved without disturbing the image by executing a speed adjustment during print the process, except for the electrostatic latent image forming intervals, for each color.

The process described above can eliminate the speed difference between the photosensitive member and the intermediate transcription member due to the distortion in the photosensitive member and the intermediate transcription member caused by environmental effects, such as a change in temperature or a change with time due to slip in the mechanism of the photosensitive member. By means of the above process, in a case of multi-color printing, the problem of the diameter increase of the intermediate transcription member can be solved, and toner images in plural colors can be formed on the intermediate transcription member without color displacement to obtain an excellent image in result.

According to the present invention, since the intermediate transcription member is driven so as to rotate by means of the driving force of friction and the electrostatic adsorption force between a contact portion of the intermediate transcription member and the photosensitive member, a relative speed difference does not occur due to distortion of the photosensitive member or the intermediate transcription member. Further, since the rotating frequency and the rotating speed of the intermediate transcription member can be measured based on a signal from the detecting means for detecting when the intermediate transcription member passes across a predetermined position and a signal from the intermediate transcription member rotating speed measuring means during rotation of the intermediate transcription member, the occurrence of the speed difference in every rotation between the photosensitive member and the intermediate transcription member can be eliminated by controlling the photosensitive member driving means based on the measured result. And, by performing this control in the initial processing at the time of power switching-on and/or in the interval between printing pages and/or in the interval between each of formation of a toner image, disorder in the image during forming of an image or positional shear between the being image formed and the electrostatic latent images for the preceding colors does not occur due to said control.

Therefore, a high definition color image can be obtained by accurately superposing each of the color toner images when a plurality of toner images having different colors are transferred into superposition onto an intermediate transcription member in order to obtain a colored toner image.

We claim:

1. A color printer, comprising:

a photosensitive member rotatable in a rotating direction by a photosensitive member rotating means;

means for controlling laser beam flash by modulating a laser beam with video signals;

deflecting means for forming an electrostatic latent image on said photosensitive member by exposing said photosensitive member to said laser beam while scanning said laser beam perpendicular to the rotating direction of said photosensitive member using a polygon mirror;

beam detecting means for generating a printing synchronization signal by detecting said laser beam passing across a given position;

video signal generating means for generating said video signal in synchronism with said printing synchronization signal;

developing means for forming a toner image by developing an electrostatic latent image formed on said photosensitive member;

an intermediate transcription member rotating in contact with and synchronized in rotating speed with said photosensitive member to transfer a toner image formed on said photosensitive member to said intermediate transcription member;

intermediate transcription member supporting means for supporting said intermediate transcription member in such a manner that said intermediate transcription member may be driven to be rotated by said photosensitive member through the contact between said photosensitive member and said intermediate transcription member;

detecting means for detecting when a point on said intermediate transcription member passes across a predetermined position;

intermediate transcription member rotating speed measuring means for detecting the rotating speed of said intermediate transcription member; and photosensitive member rotating speed adjusting means operative during a predetermined period of time when said deflecting means is not forming an electrostatic latent image on said photosensitive member and said developing means is not forming a toner image on said photosensitive member, for controlling the photosensitive member rotating speed caused by said photosensitive member rotating means such that the rotating speed of said intermediate transcription member is maintained at a given speed using an intermediate transcription member speed signal obtained from said intermediate transcription member rotating speed measuring means.

2. A color printer according to claim 1, further comprising control means for setting a photosensitive member rotating speed control target value for said photosensitive member rotating speed adjusting means during an initial processing at power switching-on and/or in a region between printing pages and/or in a region between formation of various color toner images.

3. A color printer, comprising:

a photosensitive belt rotatable in a rotating direction by a photosensitive belt rotating means;

means for controlling laser beam flash by modulating a laser beam with video signals;

deflecting means for forming an electrostatic latent image on said photosensitive belt by exposing said photosensitive belt to said laser beam while scanning said laser beam perpendicular to the rotating direction of said photosensitive belt using a polygon mirror;

beam detecting means for generating a printing synchronization signal by detecting said laser beam passing across a given position;

video signal generating means for generating said video signal in synchronism with said printing synchronization signal;

developing means for forming a toner image by developing an electrostatic latent image formed on said photosensitive belt;

an intermediate transcription drum rotating in contact with and synchronized in rotating speed with said photosensitive belt to transfer a toner image formed on said photosensitive belt to said intermediate transcription drum;

an intermediate transcription drum supporting means for supporting said intermediate transcription drum in such a manner that said intermediate transcription drum may be driven to be rotated by said photosensitive belt through the contact between said photosensitive belt and said intermediate transcription drum;

detecting means for detecting when a point on said intermediate transcription drum passes across a predetermined position;

intermediate transcription drum rotating speed measuring means for detecting the rotating speed of said intermediate transcription drum; and photosensitive belt rotating speed adjusting means operative during a predetermined period of time when said deflecting means is not forming an electrostatic latent image on said photosensitive belt and said developing means is not forming a toner image on said photosensitive belt, for controlling the photosensitive belt rotating speed caused by said photosensitive belt rotating means such that the rotating speed of said intermediate transcription drum is maintained at a given speed using an intermediate transcription drum speed signal obtained from said intermediate transcription drum rotating speed measuring means.

* * * * *